Nov. 18, 1930.  C. L. FLORISSON  1,782,294
METHOD AND APPARATUS FOR TORPEDO FIRING OPERATIONS
Filed June 13, 1928    2 Sheets-Sheet 1
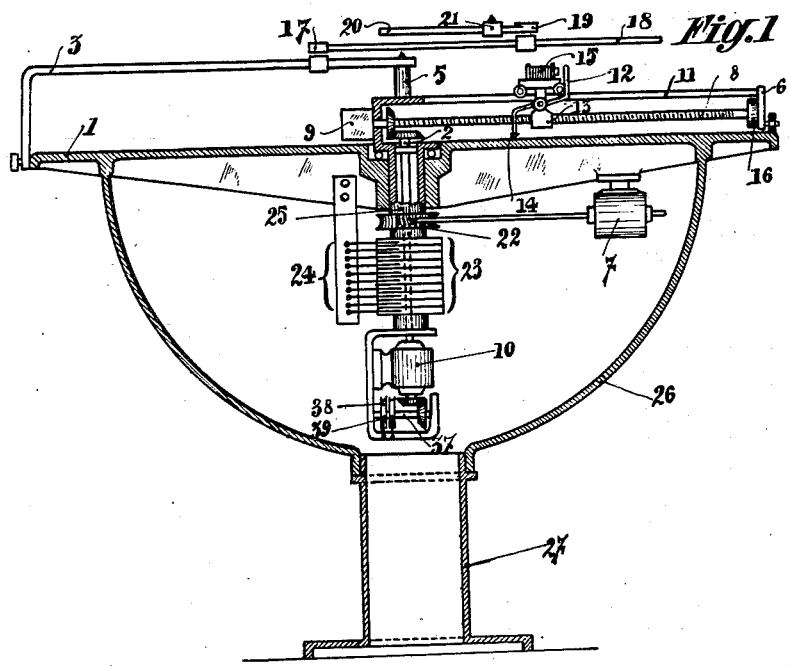
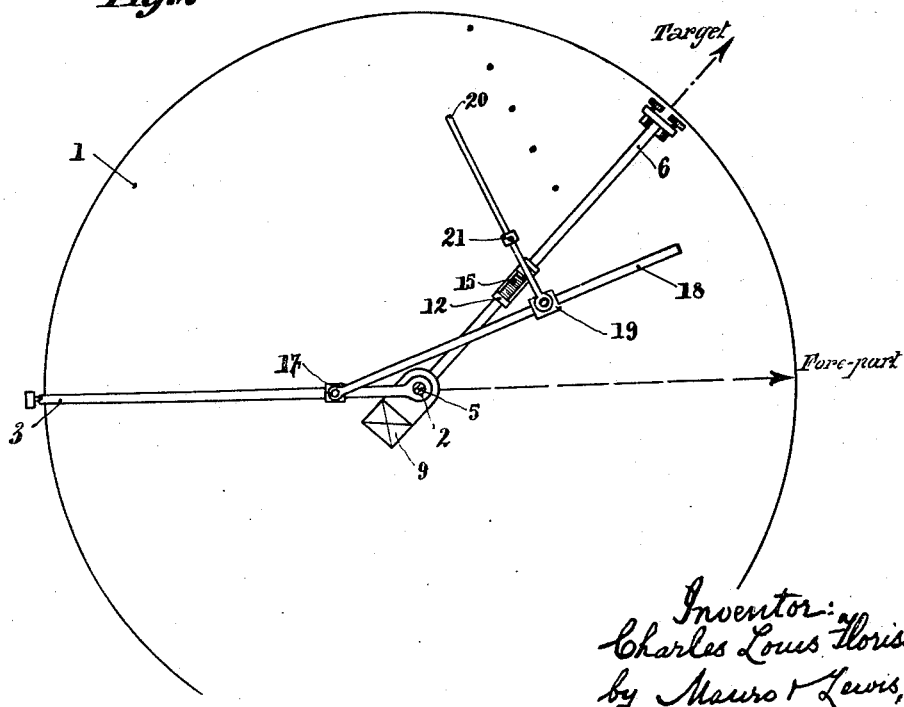
Inventor:
Charles Louis Florisson
by Mauro & Lewis,
Attorneys.

Nov. 18, 1930.  C. L. FLORISSON  1,782,294
METHOD AND APPARATUS FOR TORPEDO FIRING OPERATIONS
Filed June 13, 1928  2 Sheets-Sheet 2

Applicant:-
Charles Louis Florisson
By Mauro + Lewis
Attorneys

Patented Nov. 18, 1930

1,782,294

UNITED STATES PATENT OFFICE

CHARLES LOUIS FLORISSON, OF BECON-LES-BRUYERES, FRANCE, ASSIGNOR TO SOCIETE DE CONDENSATION ET D'APPLICATIONS MECANIQUES, OF PARIS, FRANCE

METHOD AND APPARATUS FOR TORPEDO-FIRING OPERATIONS

Application filed June 13, 1928, Serial No. 285,182, and in France June 28, 1927.

The present invention has for its object a method and apparatus by which torpedo firing operations may be performed by the aid of a record of the course of the target vessel which is automatically produced on board the firing vessel, and by the immediate construction of the sighting triangle which is deduced therefrom. The record of the course of the target is obtained by means of echoes of elastic submarine vibrations transmitted by the firing vessel, such echoes being reflected back from the hull of the target vessel.

The said method and accompanying apparatus will thus constitute a new application of the known properties and apparatus for submarine detection by means of echoes whereby to determine the position of a submarine obstacle by means of the elastic vibrations which are propagated in the water.

In a general manner, the arrangement may be constituted as follows:—

(a) The combination of a director vibratory transmitting apparatus, which is so disposed that the elastic energy which it transmits in the water is concentrated in a certain direction, in which the apparatus is turned; and of a directive vibratory receiving apparatus of such nature that it can be rotated and that its sensitiveness is a maximum in a given direction; or, (b) The combination of a directive vibratory transmitting apparatus and a non-directive vibratory receiver (i. e. a receiving apparatus which is also adapted to receive vibrations from any direction); or inversely, a non-directive transmitting apparatus (i. e. an apparatus transmitting energy in all directions) and a directive vibratory receiver.

The apparatus comprised under (a) and (b) possess the two qualities specified as follows:

1. They may be employed on board a vessel to determine the direction or bearing of another vessel either, in the case of the apparatus cited under (a) by observing the direction of the axis of the receiver when the echoes are noted upon the said vessel; or in the case of the apparatus cited under (b) by observing the direction of the axis of the apparatus (either the transmitter or receiver) which is directive when the echoes are noted upon this latter vessel.

2. They are employed on board a vessel to determine the distance of another vessel by the measurement, on board the first vessel, of the lapse of time $t$ between the transmission of the vibratory submarine signal and the reception of its echo reflected from the second vessel or target. If $V$ is the known speed of travel of elastic vibrations in water (for instance 1500 meters per second for sea water), the desired distance $d$ is given by the known ratio $$d = \frac{Vt}{2}$$

The method and apparatus, the subject-matter of the present invention, are based upon the use on board the firing vessel, of the two aforesaid properties, for the mechanical and automatic obtainment of the record, made by successive points, of the course of the target vessel relative to the firing vessel the said record being made in such manner as to show the relative speed of the target upon its course. The apparatus further comprises a specially combined apparatus which allows the operator, by means of firing data concerning the target which are thus obtained, and of his own firing data, to at once mechanically produce the sighting triangle, and to find the moment at which the target traverses the sighting line, i. e. the instant and the place at which the torpedo meets the target.

The following description and the appended drawings show the principle of the said invention and the means by which it may be carried into effect.

Figure 1 represents a general vertical section of the apparatus, and

Figure 2 is the corresponding plan view.

Figure 3:
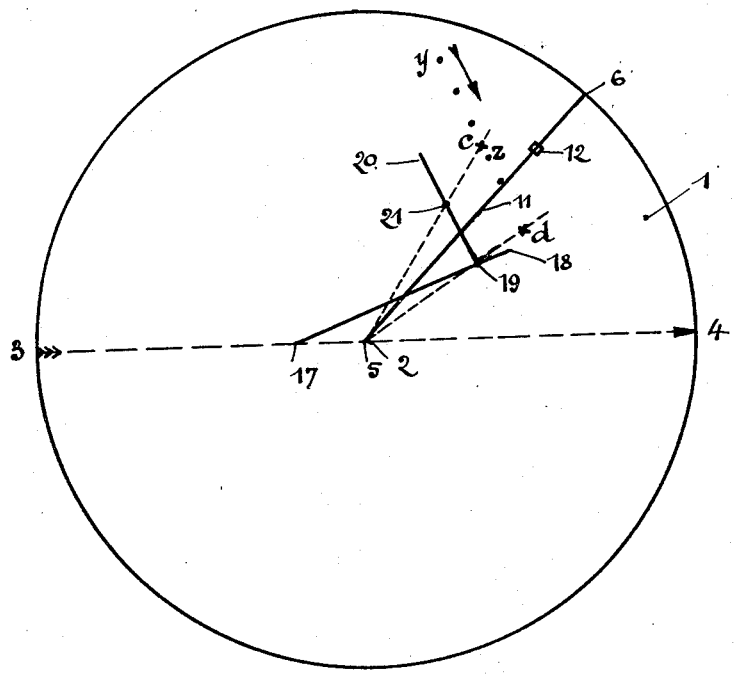
Figure 3 is a diagrammatic plan view of the disc with its various arms, rulers and slides; the rulers and arms being represented by lines, and the slides by points, for clearness in the figure. The Figure 3 also shows the diagram of an attack, with the construction of the sighting triangle.

The apparatus shown in Figures 1 to 3 comprises a large disc 1 which is mounted in the fixed position on board the firing vessel, and which represents the plane relative to the firing vessel. A point 2 of the said disc represents the firing vessel and a straight line 3—4 represents the longitudinal axis of the firing vessel, the forward part being situated at 4. Upon an axle of rotation 5, normal to the said disc and passing through the firer 2, is pivotally mounted an arm 2—6 whose direction is maintained constantly parallel with the axis of the directing vibratory apparatus employed, and which as above stated permits the determination of the direction of the target. This is effected, for instance, in the case (a) by providing the device used for the orientation of the directive receiver mounted on the firing vessel, with an apparatus (of known type) for determining and transmitting to a suitable receiver the angular location of the target; and by mechanically connecting a corresponding apparatus 7 for receiving the determined angular location with the arm 2—6. Numerous mechanical or electrical devices for transmission of such angular locations are in use at the present time and provide for the easy obtainment of this condition; in the case (b) the device for the control of the one of the two apparatus, transmitter or receiver, which is directive, will always comprise a pointer movable on a graduated scale and showing, with reference to the firing vessel, the direction of the target when the echo is produced by the latter. In this case as well, I add to the device for the control, as above indicated, an apparatus for transmitting the angular location, as in case (a) which is indicated by the pointer, and also connect the arm 2—6 with a corresponding receiver 7 for the determined angular location, in such manner that the direction 2—6 will thus, upon the disc, be constantly situated according to the bearing shown by the pointer.

In these conditions, when a target is situated within the range of the vibratory apparatus of the firing vessel employed for transmission and reception, if the usual operator, while controlling this apparatus adapted for the direct locating by means of echoes, determines by the known methods the direction of the propagation of the waves of the echo furnished by the target, the particular devices above mentioned will automatically represent upon the disc 1 (or the plane relative to the firing vessel) the direction of the target, which is the direction 2—6, or the first of the polar co-ordinates representing the relative position of the target.

The arm 2—6 further carries a registering system for the distance of the target (the second of the polar co-ordinates representing the relative position of the target) which consists of the following parts:—

A slide 12 whose inoperative position is at 2;—an actuating device which acts (by means of an engaging device or clutch actuated during the transmission of a vibratory signal by the firing vessel) so as to move the said slide 12 at this time from 2 to 6 at a constant speed $v$ equal to $$\frac{V}{2p},$$

in which V is the constant and known speed of propagation of the elastic vibrations in the water, and $$\frac{1}{p}$$

is the scale, determined in advance, by which it is desired that the apparatus shall lay out upon the disc 1 the successive positions of the gun firer;—and an automatic device for reversing the motion of the slide which acts, when the latter has attained the end 6 of the arm 2—6, to bring the slide 12 to the point 2 or to the zero position.

The slide 12 carries, a short distance above the disc 1, a tracing point which a mechanical or electrical device, controlled by the echo-receiving apparatus, brings down so as to mark a line upon the disc 1 during the reception of the echo produced by the target.

The length of the arms 2—6 and the dimensions to be given to the disc 1 are determined by the range of action of the vibratory transmitting and receiving apparatus utilized by gun firer, and by the scale adopted. For example, if the range of action is 5000 meters, and if the scale adopted is $$\frac{1}{10.000},$$

this will lead to the use of a length of 50 centimeters for the amount of the free path of the slide 12 upon the arm 2—6. The disc should thus have in this case a radius of at least 50 cm. It is also observed that the speed $v$ of the slide, in the direction 2—3 as above specified, should be in this case $$\frac{150.000}{2 \times 10.000} = 7.5 \text{cm}.$$

per second, if V=1500 meters per second.

By way of example, I will describe a form of construction of the registering system for the distance of the target corresponding to the purpose above mentioned, but it is obvious that any other construction of the apparatus complying with the same conditions will remain within the limits of the present invention.

The arm 2—6 supports a screw 8 having the same direction as 2—6, which by a quick-acting clutch 9 actuated by means of the vibratory transmitter during the transmission of a submarine signal by the gun firer, may be connected with a device 10 rotatable in a continuous manner at constant speed (i. e. a known device such as is currently employed) mounted on the arm 2—6 or on a suitably shaped support carried by the arm. The constant speed of rotation of $n$ revolutions per second which is assumed by the screw from the start of the transmission, should be such that the product of its pitch $p$ by $n$, or $p \times n$, should be equal—for the scale adopted for the chart—to half the speed V of the elastic vibrations in the water.

The arm 2—6 also carries—on a guide 11—a small slide 12 secured to a nut 13 (the slide and nut thus forming the slide 12) in which is disposed the screw 8. Due to the rotation of the screw—since the nut will not turn—the said slide will be moved from 2 to 6 at $\frac{1}{2}$ the speed of sound in water, to the scale of the chart.

The slide 12 carries a tracing point 14 which in the zero position is held for a short distance above the disc 1; an electromagnet 15 (or like actuating device) under the control of the echo-receiving apparatus, serves to lower the tracing point 14 upon the disc for an instant at the time of the echo, thus causing it to mark a line upon the disc.

The said slide, during its motion from 2 to 6 which is set off by the signal, will thus trace, upon the occurrence of the echo, the relative position of the target upon the disc. After the echo has ceased, it continues to move as far as 6, and is then to be brought back to 2 to prepare for the next record.

For this purpose, the rotation of the screw in the direction which brings the slide from 2 to 6 serves to wind the spring 16 whose elastic force brings upon the said screw a couple which if the screw were disengaged and in the state would rotate it in the contrary direction, i. e. would bring back the nut 13, and hence the slide, to the point 2 and into contact with a central stop mounted on the arm 2—6. The said arm 2—6 also carries at 6 a stop provided with engaging gear connected with the clutch 9 which upon the return of the carriage into contact will release the screw from the actuating device 10 and will allow the spring 16—when expanding—to bring the slide from 6 to 2 as above stated.

A switch or other suitable device is used with the clutch 9, so as to enable the operator charged with the vibratory transmitting and receiving apparatus to operate the device for recording the distance to the target only when he is certain that it is actually the echo reflected from the target that is heard. On the contrary, the device for determining and transmitting the angular location will remain constantly in service.

The preceding description clearly shows that when the gunner engaged in suitably operating the vibratory transmitter and receiver for the detecting, follows the target by means of the successive transmissions and echoes, the apparatus according to the present invention will automatically effect the marking—by points—of the relative course of the target upon the disc 1.

The following arrangement further permits the apparatus to indicate, upon this course, the relative speed of the target, which firing indication should be known by the gun firer.

The simplest method for this purpose consists in recording the successive points of the target upon its course at constant and known intervals of time, for instance, T seconds; by then measuring upon the chart the distance $x$ between two successive points, the relative speed of the target on its course between these two points will be $$\frac{x}{T}$$

to the scale of the chart. This result may be obtained, for example, in the following manner.

I utilize as an automatic chronograph affording the interval of T seconds, a shaft 37 actuated by the constant-speed device 10 by speed-reduction gear in such manner that it rotates at the rate of one revolution in T seconds. The shaft 37 carries two cams 38—39 having the proper angular spacing. The cam 38 closes, at each interval of T seconds, a switch which is suitably connected with the vibratory transmitter and with the clutch 9 and whose closing automatically produces the transmission of the signal and causes at the same time the functioning of the clutch 9.

On the other hand, the usual hand control for the transmissions of the said vibratory transmitter and receiver by its operator is so disposed that it remains independent of the clutch 9; in this manner, only the transmission effected automatically every T seconds by the tracing apparatus will furnish records for the successive positions of the target upon its course.

During the unoccupied time which elapses between the arrival of the slide at 6 and the next automatic transmission, the gunner employs himself in sending out wave signal at will and in seeking for the echoes of the target by successive balancings of the apparatus, in order to locate the target, according to usual practice for submarine detection, and he is thus enabled to follow the vessel on its course.

Upon the shaft 37 which bears the cam 38 is also keyed a cam 39. The position or the outline of the latter cam is such that it cooperates with a contact before the cam 38 cooperates with the above mentioned switch which corresponds therewith.

The contact cooperating with cam 39 operates to close the energizing circuit of a lamp so that the latter will be lighted before cam 38 cooperates with its corresponding contact; whereby the said lamp is lighted an instant before the automatic transmission takes place. This will allow the said operator who has been following the target during the aforesaid unoccupied time, to hold the directive apparatus in the direction of the target while the apparatus performs the automatic recording of succeeding position of the target on its course.

Figure 4:
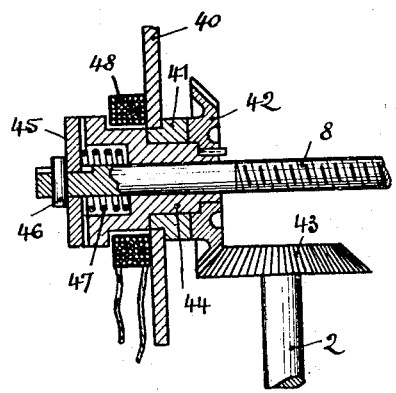
Fig. 4 is a sectional view of a detail.

Fig. 4 shows a preferred embodiment of the clutch 9.

40 is the frame supporting the clutch; 41 is any suitable bearing; 42 is a driven bevel pinion; 43 a driving bevel pinion meshing with pinion 42 and keyed upon the motor shaft 2; 44 is a soft iron sleeve loosely mounted upon the shaft 8 and connected with the bevel pinion 42 (for instance through a key); 45 is a soft iron plate slidably movable upon the shaft 8 but held against rotation relatively to the shaft so as to be rotatably driven through it; 46 is a stop pin, 47 a spring and 48 an annular stationary coil secured to the frame 40.

The operation of the device is as follows:
Upon 43 being rotated at a constant speed, 42 and 44 are driven continuously. So long as any current does not energize 48, the sleeve 44 is not magnetized and the clutch plate 45 being held apart by the spring 48 cannot put into rotation the shaft 8 and the sleeve 44.

As soon as a current, due to the apparatus being operated, energizes 48, 44 becomes a magnet which pulls 45 against the compression of the spring 47 and makes the clutch operative, 44 and 8 are thus driven.

The arrangements above described will thus allow the apparatus according to the present invention to mark out the course of the target, by the successive equidistant positions in time (using intervals of T) the measurement of whose spacing upon the chart will show to the gunner the speed of the target. These data, i. e. the course of the target and the speed of this latter, are the data for the firing which are necessary and sufficient for the gun firer to know in order that he may prepare his attack with the torpedo. It will be further remarked in Figure 1 that I employ the pinions 22 for the device receiving the indications for the location 7 by means of which the orientation of the arm 2—6 mounted on the shaft 25 is obtained; 23 are the rings and 24 the brushes assuring the electric connections for the elements mounted on the movable part of the apparatus; 26 is a casing which protects the parts; 27 is the tripod supporting the apparatus.

The gun firer makes use of the data thus furnished by the apparatus to determine the firing elements by which he is enabled to make his attack in the best conditions, which are:—his course, his speed upon the course, the orientation of the torpedo-launching tube which is to be utilized, or the orientation of the path which is to be followed by the torpedo if he makes use of a tropedo with gyroscope of the deflected type, and also the speed of the torpedo which is to be utilized.

These complete firing data, which the gun firer has ascertained during the last period of his attack, are employed by him in order to at once lay out by mechanical means the sighting triangle by the use of the following special arrangement, combined with the marking apparatus.

Above the arm 2—6 is disposed a stationary orientation arm 2—3 situated according to the axis of the gun firer and towards the rear. The said arm forms a straight edge or ruler, termed "firing ruler" which is graduated from 2 to 3 according to the speed of the firing vessel upon its course, to the scale of the chart. The slide 17 is mounted upon the said ruler, and it is to be maintained by the operator occupied with the recording apparatus at a distance from the point 2 which is equal to the speed of the firing vessel which is already known. The normal projection of the segment 17—2 upon the disc will thus represent a vector whose value is equal to that of the speed of the firing vessel, its course, and whose end is situated at 2.

The slide 17 carries a journal whose axis is normal to the disc 1, about which is rotatable, in a plane parallel with the disc 1, a ruler 17—18 termed "torpedo ruler" which the operator of the apparatus secures to the said journal in such manner that the direction 17—18 is parallel with the course already chosen for the torpedo. The said "torpedo ruler" is graduated from 17 to 18 in speeds of the torpedo according to the scale of the chart. A slide 19 movable upon the said torpedo ruler is secured by the operator at a distance from the point 17 which is equal to the speed of the torpedo, already known.

The normal projection of the segment 17—18 upon the said disc thus represents a vector which is equal in value to the speed of the torpedo and whose origin is situated at the point 17. The slide 19 carries a journal whose axis is normal to the disc 1 and upon which is pivotally mounted a ruler 19—20 termed "target ruler" which is graduated from 19 to 20 in speeds of the target, according to the scale of the chart.

The operator utilizes the part of the course of the target which has been already marked out, and he secures the "target ruler" to its journal and parallel with the relative course of the target. He reads the speed of the target upon the chart and secures a slide 21 to the target ruler at a distance from the point 19 equal to the speed of the target and in the opposite direction.

The normal projection of the segment 21—19 upon the disc 1 will thus represent a vector whose value is that of the speed of the target, and whose end is at 19. The three rulers i. e. for the firer, the torpedo and the target, may obviously be graduated in speeds to a common scale, which is different from the one on the chart.

The slide 21 carries a pointed member whose axis is normal to the disc 1. The end of the shaft 5 also carries a pointed member which represents the firer 2. The line 2—21 is the line of sight, and this may if desired be represented by a ruler which the operator places in the direction 2—21. After laying out the sighting triangle as above stated, the operator charged with the vibratory transmitting and receiving apparatus will continue to follow the target with precision. The operator of the registering apparatus follows the target on its course and will control the firing of the torpedo when the target crosses the line of sight 2—21.

Figure 3 represents the geometrical diagram relative to an attacking operation and will clearly show the functioning of the above-mentioned apparatus.

The dotted line y—z represents the part already marked out, of the course of the target, and for the sake of simplicity this is supposed to be straight, i. e. the absolute courses of the target and the firer are supposed, in the case of the figure, to be straight and to be covered at constant speeds.

The sighting triangle, laid out as above stated, is defined by the points 2—19—21. It should in fact be noted that this triangle is to be laid out on the disc 1, i. e. in the relative plane of the firer, so that its two known sides should represent the relative speed of the torpedo and the relative speed of the target. The relative speed of the torpedo is represented by the vector 2—19 (not materialized), this being the geometric difference between the vector 17—19 or the absolute speed of the torpedo, and the vector 17—2 or the absolute speed of the firer. The vector 21—19, or relative speed of the target, is directly given by the chart furnished by the registering apparatus.

It is observed in this figure that the firing should take place when the target arrives at c i. e. the intersection of the lines of speed 2—21 and of the course y z. The torpedo will attain the target when the latter attains the point d, or the intersection of the relative courses of the target y z and of the torpedo 2—19. The recording apparatus thus serves, when following the target upon its course, after the torpedo has been fired, as an indicator of the point of impact, and it allows the firer to observe, among the other explosions noted in a combat, for instance, the one that is the most likely to show the success of his attack.

Instead of placing the three rulers in the position above indicated, they may be placed in positions which are relatively symmetrical with reference to the stationary point, so as to avoid encumbering the disc above the recording arm.

The general preceding general account of the method shows that the present invention affords a complete and accurate solution of the problem of torpedo attacks and firing. It offers a great improvement in the methods of torpedo firing hitherto employed. The invention is applicable to all vessels firing torpedoes, and chiefly to submarine vessels. In this latter case the improvement in the methods based upon the use of the periscope (determination by estimates of the distance of the target, its speed, and the inclination of its course relatively to the radius vector represented by the line from the periscope to the target) is considerable. The new apparatus substitutes for the firing data concerning the target, which are only approximate and subjective and are simply estimated by the use of the periscope, exact data which are objectively measured. Furthermore, the apparatus now makes it unnecessary to employ the periscope during the whole period of the attack thus conducted with precision, so that the firing submarine will not reveal its presence by any material object at the surface of the water, and the firing vessel is also enabled to make its attack when deeply immersed in the water, thus greatly increasing its safety and hence reassuring the crew, which is an important factor.

What I claim is:—

1. The process for conducting the firing of torpedoes which comprises sending, on board of the first vessel, towards the target vessel, elastic submarine waves, receiving the echo thereof, causing the course of said waves to be automatically recorded on a reduced scale, while they travel, repeating said successive operations at intervals whereby the relative disposition of both vessels is drawn on a reduced scale and the speed of the target vessel may be calculated therefrom for deducing the firing data for the torpedo.

2. The process for conducting the firing of torpedoes which comprises sending, on board of the first vessel, towards the target vessel, elastic submarine waves, receiving the echo thereof, causing the course of said waves to be automatically recorded on a reduced scale, while they travel, repeating said successive operations at intervals, whereby the speed of the target vessel may be calculated, and constructing a sighting triangle by means of the known and of the calculated elements for the purpose set forth.

3. An apparatus for the control of torpedo firing, which comprises, on board the firing vessel, means for transmitting elastic submarine waves and for receiving such waves, said means being rotatable in order to follow the direction of the target vessel whose hull sends back echoes, a plane table connected with the firing vessel, a rod parallel with said table and pivoted on a fixed point, means whereby the said rod may be placed parallel with the direction of the target vessel, an element movable along the said rod at a speed proportional to half the speed of the elastic waves in the water, means provided on the said element for producing a record upon the said plane table connected with the firing vessel when the echo of the elastic waves is received, said record corresponding to the position of the target vessel, a set of three rulers pivoted together, slides movable on the said rulers and carrying the pivot joints, the first ruler being pivoted on the joint on which is pivoted the rod placed parallel with the direction of the target, the first ruler being graduated in speeds of the firing vessel, the second in speeds of the torpedo, and the third in speeds of the target vessel.

4. An apparatus for the control of torpedo firing, which comprises, on board the firing vessel, means for transmitting elastic submarine waves and for receiving such waves, said means being rotatable in order to follow the direction of the target vessel whose hull sends back echoes, a plane table connected with the firing vessel, a rod parallel with said table and pivoted on a fixed point, means whereby the said rod may be placed parallel with the direction of the target vessel, a carriage provided with recording means and adapted for displacement along the said rod, constant-speed motor by which the said carriage is displaced along the rod at a speed proportional to one-half the speed of the elastic waves in the water, which displacement commences at the time of the transmission of elastic waves, means for operating the said recording means when the echo returns, whereby a record point will be made upon the said plane table connected with the firing vessel, means for returning the said carriage to its starting point at a high speed, and means for laying out upon the said plane table connected with the firing vessel the sighting triangle affording the data for firing the torpedo.

5. An apparatus for the control of torpedo firing, which comprises, on board the firing vessel, means for transmitting elastic submarine waves and for receiving such waves, said means being rotatable in order to follow the direction of the target vessel whose hull sends back echoes, a plane table connected with the firing vessel, a rod parallel with said table and pivoted on a fixed point, means whereby the said rod may be placed parallel with the direction of the target vessel, a carriage provided with recording means and adapted for displacement along the said rod, constant-speed motor by which the said carriage is displaced along the rod at a speed proportional to one-half the speed of the elastic waves in the water, which displacement commences at the time of the transmission of elastic waves, means for operating the said recording means when the echo returns, whereby a record point will be made upon the said plane table connected with the firing vessel, means for returning the said carriage to its starting point at a high speed, means actuated by the constant-speed motor for the simultaneous control at regular intervals, of the functioning of the elastic wave transmitting apparatus, and means for laying upon the said plane table connected with the firing vessel the sighting triangle affording the data for firing the torpedo.

6. An apparatus for the control of torpedo firing, which comprises, on board the firing vessel, means for transmitting elastic submarine waves and for receiving such waves, said means being rotatable in order to follow the direction of the target vessel whose hull sends back echoes, a plane table connected with the firing vessel, a rod parallel with said table and pivoted on a fixed point, means whereby the said rod may be placed parallel with the direction of the target vessel, a carriage provided with recording means and adapted for displacement along the said rod, constant-speed motor by which the said carriage is displaced along the rod at a speed proportional to one-half the speed of the elastic waves in the water, which displacement commences at the time of the transmission of elastic waves, means for operating the said recording means when the echo returns whereby a record point will be made upon the said plane table connected with the firing vessel, means for returning the said carriage to its starting point at a high speed, means actuated by the constant-speed motor for the simultaneous control at regular intervals, of the functioning of the elastic wave transmitting apparatus, and means for laying out upon the said plane table connected with the firing vessel the sighting triangle affording the data for firing the torpedo a signal alarm device for automatically indicating the time at which the automatic transmission of the elastic waves is to be effected.

In testimony whereof I have signed this specification.

CHARLES LOUIS FLORISSON.